(12) United States Patent
Hofmann et al.

(10) Patent No.: US 6,835,687 B2
(45) Date of Patent: Dec. 28, 2004

(54) METHOD FOR PRODUCING DOUBLE METAL CYANIDE (DMC) CATALYSTS

(75) Inventors: Jörg Hofmann, Krefeld (DE); Stephan Ehlers, Köln (DE); Bernd Klinksiek, Bergisch Gladbach (DE); Thorsten Fechtel, Köln (DE); Matthias Ruhland, Köln (DE); Jürgen Scholz, Leverkusen (DE); Franz Föhles, Tönisvorst (DE); Ulrich Esser, Kürten (DE)

(73) Assignee: Bayer Aktiengesellschaft, Leverkusen (DE)

( * ) Notice: Subject to any disclaimer, the term of this patent is extended or adjusted under 35 U.S.C. 154(b) by 2 days.

(21) Appl. No.: 10/257,706

(22) PCT Filed: Apr. 17, 2001

(86) PCT No.: PCT/EP01/04342

§ 371 (c)(1),
(2), (4) Date: Mar. 5, 2003

(87) PCT Pub. No.: WO01/80994

PCT Pub. Date: Nov. 1, 2001

(65) Prior Publication Data

US 2003/0158449 A1 Aug. 21, 2003

(30) Foreign Application Priority Data

Apr. 20, 2000 (DE) .......................... 100 19 898

(51) Int. Cl.[7] .......................... B01J 27/26; B01J 33/22
(52) U.S. Cl. .................. 502/175; 502/154; 502/156; 502/200
(58) Field of Search .................. 502/154, 156, 502/175, 200; 568/618, 620

(56) References Cited

U.S. PATENT DOCUMENTS

| 3,404,109 | A | 10/1968 | Milgrom ................ 260/611 |
| 3,829,505 | A | 8/1974 | Herold ................ 260/611 B |
| 3,941,849 | A | 3/1976 | Herold ................ 260/607 A |
| 4,996,004 | A | 2/1991 | Bücheler et al. ........... 252/314 |
| 5,116,536 | A | 5/1992 | Bücheler et al. ........... 252/314 |
| 5,158,922 | A | 10/1992 | Hinney et al. ............. 502/175 |
| 5,482,908 | A | 1/1996 | Le-Khac ................ 502/156 |
| 5,536,883 | A | 7/1996 | Le-Khac ................ 568/620 |
| 5,545,601 | A | 8/1996 | Le-Khac ................ 502/156 |
| 5,627,120 | A | 5/1997 | Le-Khac ................ 502/156 |
| 5,637,673 | A | 6/1997 | Le-Khac ................ 528/405 |
| 5,714,428 | A | 2/1998 | Le-Khac ................ 502/159 |
| 5,731,407 | A | 3/1998 | Le-Khac ................ 528/409 |
| 5,789,626 | A | 8/1998 | Le-Khac ................ 568/620 |
| 5,803,600 | A | 9/1998 | Schubert et al. ........... 366/144 |
| 5,891,818 | A | 4/1999 | Soltani-Ahmadi .......... 502/175 |
| 5,900,384 | A | 5/1999 | Soltani-Ahmadi et al. ... 502/175 |
| 6,103,786 | A | * 8/2000 | Hoch et al. ............... 523/336 |
| 6,323,375 | B1 | 11/2001 | Hofmann et al. ........... 568/613 |
| 6,387,282 | B1 | * 5/2002 | Heckl et al. .............. 210/770 |
| 2002/0057627 | A1 | 5/2002 | Schubert et al. ........... 366/336 |
| 2002/0068812 | A1 | 6/2002 | Hofmann et al. ........... 528/415 |

FOREIGN PATENT DOCUMENTS

| DE | 199 05 611 | 8/2000 | |
| DE | 199 58 355 | 6/2001 | |
| EP | 1 029 871 | 8/2000 | |
| WO | 99/01203 | 1/1999 | ......... B01D/53/86 |
| WO | 99/19063 | 4/1999 | ......... B01J/27/26 |
| WO | 99/56874 | 11/1999 | ......... B01J/27/26 |

* cited by examiner

Primary Examiner—Rosalynd Keys
(74) Attorney, Agent, or Firm—Joseph C. Gil; John E. Mrozinski, Jr.

(57) ABSTRACT

The invention provides an improved process for the preparation of double metal cyanide (DMC) catalysts for the preparation of polyether polyols by polyaddition of alkylene oxides on to starter compounds containing active hydrogen atoms, in which aqueous solutions of a metal salt and a metal cyanide salt are first reacted in the presence of an organic complexing ligand and optionally one or more further complex-forming components to form a DMC catalyst dispersion, this dispersion is then filtered, the filter cake is subsequently washed with one or more aqueous or non-aqueous solutions of the organic complexing ligand and optionally one or more further complex-forming components by a filter cake washing and the washed filter cake is finally dried, after an optional pressing out or mechanical removal of moisture.

21 Claims, No Drawings

METHOD FOR PRODUCING DOUBLE METAL CYANIDE (DMC) CATALYSTS

TECHNICAL FIELD OF THE INVENTION

The invention relates to an improved process for the preparation of double metal cyanide (DMC) catalysts for the preparation of polyether polyols by polyaddition of alkylene oxides on to starter compounds containing active hydrogen atoms.

BACKGROUND OF THE INVENTION

Double metal cyanide (DMC) catalysts for the polyaddition of alkylene oxides on to starter compounds containing active hydrogen atoms have been known for a long time (see, for example, U.S. Pat. No. 3,404,109, U.S. Pat. No. 3,829,505, U.S. Pat. No. 3,941,849 and U.S. Pat. No. A 5,158,922). The use of these DMC catalysts for the preparation of polyether polyols has the effect, in particular, of a reduction in the content of monofunctional polyethers with terminal double bonds, so-called mono-ols, compared with the conventional preparation of polyether polyols by means of alkali metal catalysts, such as alkali metal hydroxides. The polyether polyols obtained in this way can be processed to high-quality polyurethanes (e.g. elastomers, foams and coatings).

DMC catalysts are usually obtained by reacting an aqueous solution of a metal salt with the aqueous solution of a metal cyanide salt in the presence of an organic complexing ligands, e.g. an ether. In a typical catalyst preparation, for example, aqueous solutions of zinc chloride (in excess) and potassium hexacyanocobaltate are mixed and dimethoxyethane (glyme) is than added to the dispersion formed. After filtration and washing of the catalyst with aqueous glyme solution, an active catalyst of the general formula

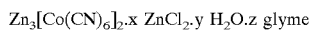
$$Zn_3[Co(CN)_6]_2 \cdot x\ ZnCl_2 \cdot y\ H_2O \cdot z\ glyme$$

is obtained (see e.g. EP-A 700 949).

According to the prior art, DMC catalysts are prepared e.g. by mixing aqueous solutions of a metal salt (preferably of a zinc salt, such as e.g. zinc chloride) and a metal cyanide salt (e.g. potassium hexacyanocobaltate) in the presence of an organic complexing ligand (preferably tert-butanol) and optionally further ligands in a stirred tank to form a dispersion. The catalyst is isolated from the dispersion by known techniques, preferably by centrifugation or filtration. To achieve a sufficiently high catalyst activity it is necessary subsequently to wash the catalyst with an aqueous ligand solution. Water-soluble by-products, such as e.g. potassium chloride, which can reduce the activity of the catalyst, are removed from the catalyst by this washing step. According to the prior art this washing step is carried out by redispersing the catalyst in an aqueous ligand solution, e.g. in a stirred tank, with subsequent renewed isolation of the solid by e.g. centrifugation or filtration. To obtain highly active DMC catalysts it is in general necessary to wash the catalyst at least once more, non-aqueous ligand solutions preferably being used for the further washing operations. According to the prior art the further washing steps are also carried out by redispersing with subsequent isolation of the catalyst. Finally, the DMC catalyst must be dried. This form of catalyst preparation is exceptionally time-consuming and cost-intensive. Process times of more than 100 hours are required for preparation of DMC catalysts on a commercial scale (see e.g. U.S. Pat. No. 5,900,384). Because of the high catalyst costs, the profitability of the DMC-catalysed process of polyether polyol preparation is therefore considerably impaired.

SUMMARY OF THE INVENTION

It has now been found that highly active DMC catalysts can be obtained by a considerably simplified process in which aqueous solutions of a metal salt and a metal cyanide salt are first reacted in the presence of an organic complexing ligand a) and optionally one or more further complex-forming components b) to form a DMC catalyst dispersion, this dispersion is then filtered, the filter cake is subsequently washed by a filter cake washing and the washed filter cake is finally dried, after optional pressing out or mechanical removal of moisture.

This improved process for the preparation of catalysts avoids the several re-dispersions of the catalyst, with subsequent isolation, required according to the prior art to date for the preparation of highly active DMC catalysts and therefore leads to a considerable shortening of the process times for preparation of DMC catalysts. DMC catalysts which are prepared by the new, improved process have a comparable activity to DMC catalysts which are prepared in a significantly more expensive manner according to the prior art to date.

DESCRIPTION OF THE INVENTION

The present invention therefore provides an improved process for the preparation of double metal cyanide (DMC) catalysts, in which aqueous solutions of a metal salt and a metal cyanide salt are first reacted in the presence of an organic complexing ligand a) and optionally one or more further complex-forming components b) to form a DMC catalyst dispersion, this dispersion is then filtered, the filter cake is subsequently washed with one or more aqueous or non-aqueous solutions of the organic complexing ligand a) and optionally one or more further complex-forming components b) by a filter cake washing and the washed filter cake is finally dried, after an optional pressing out or mechanical removal of moisture.

The double metal cyanide compounds contained in the DMC catalysts which are suitable for the process according to the invention are the reaction products of water-soluble metal salts and water-soluble metal cyanide salts.

Water-soluble metal salts which are suitable for the preparation of the double metal cyanide compounds preferably have the general formula (I)

$$M(X)_n \tag{I},$$

wherein M is chosen from the metals Zn(II), Fc(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Zn(II), Fe(II), Co(II) and Ni(II) are particularly preferred. The X are identical or different, preferably identical anions, preferably chosen from the group consisting of halides, hydroxides, sulfates, carbonates, cyanates, thiocyanates, isocyanates, isothiocyanates, carboxylates, oxalates or nitrates. The value for n is 1, 2 or 3.

Examples of suitable water-soluble metals salts are zinc chloride, zinc bromide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel(II) chloride and nickel(II) nitrate. Mixtures of different water-soluble metal salts can also be employed.

Water-soluble metal cyanide salts which are suitable for the preparation of the double metal cyanide compounds preferably have the general formula (II):

$$(Y)_a M'(CN)_b (A)_c \tag{II},$$

wherein M' is chosen from the metals Fe(II), Fe(III), Co(II), Co(III), Cr(II), Cr(III), Mn(II), Mn(III), Ir(III), Ni(II), Rh(III), Ru(II), V(IV) and V(V). M' is particularly preferably chosen from the metals Co(II), Co(III), Fe(II), Fe(III), Cr(III), Ir(III) and Ni(II). The water-soluble metal cyanide salt can comprise one or more of these metals. The Y are identical or different, preferably identical alkali metal cations or alkaline earth metal cations. The A are identical or different, preferably identical anions chosen from the group consisting of halides, hydroxides, sulfates, carbonates, cyanates, thiocyanates, isocyanates, isothiocyanates, carboxylates, oxalates or nitrates. Both a, and b and c are integers, the values for a, b and c being chosen such that electroneutrality of the metal cyanide salt exists; a is preferably 1, 2, 3 or 4; b is preferably 4, 5 or 6; c preferably has the value 0. Examples of suitable water-soluble metal cyanide salts are potassium hexacyanocobaltate(III), potassium hexacyanoferrate(II), potassium hexacyanoferrate(III), calcium hexacyanocobaltate(III) and lithium hexacyanocobaltate(III).

Preferred double metal cyanide compounds contained in the DMC catalysts are compounds of the general formula (III)

$$M_x[M'_{x'}(CN)_y]_z \qquad (III),$$

wherein M is as defined in formula (I) and M' is as defined in formula (II), and x, x', y and z are integers and are chosen such that electroneutrality of the double metal cyanide compound exists. Preferably, x=3, x'=1, y=6 and z=2, M=Zn (II), Fe(II), Co(II) or Ni(II) and M'=Co(III), Fe(III), Cr(III) or Ir(III).

Examples of suitable double metal cyanide compounds are zinc hexacyanocobaltate(III), zinc hexacyanoiridate(III), zinc hexacyanoferrate(III) and cobalt(II) hexacyanocobaltate(III). Further examples of suitable double metal cyanide compounds are to be found e.g. in U.S. Pat. No. 5,158,922. Zinc hexacyanocobaltate(II) is particularly preferably used.

Organic complexing ligands a) which can be employed in the process according to the invention are water-soluble organic compounds with heteroatoms, such as oxygen, nitrogen, phosphorus or sulfur, which can form complexes with the double metal cyanide compound. Suitable organic complexing ligands are e.g. alcohols, aldehydes, ketones, ethers, esters, amides, ureas, nitriles, sulfides and mixtures thereof. Preferred organic complexing ligands are water-soluble aliphatic alcohols, such as ethanol, isopropanol, n-butanol, iso-butanol, sec-butanol and tert-butanol. tert-Butanol is particularly preferred.

The organic complexing ligand a) is added either during the preparation of the catalyst or directly after formation of the dispersion of the double metal cyanide compound. The organic complexing ligand a) is usually employed in excess.

DMC catalysts which are preferred for the process according to the invention are those which, in addition to the organic complexing ligands a) mentioned above, also comprise one or more further organic complex-forming components b). This component b) can be chosen from the same classes of compounds as complexing ligand a). Component b) is preferably a polyether, polyester, polycarbonate, glycidyl ether, glycoside, carboxylic acid ester of polyhydric alcohols, polyalkylene glycol sorbitan ester, a bile acid or salt, ester or amide thereof, a cyclodextrin, organic phosphate, phosphite, phosphonate, phosphonite, phosphinate or phosphinite, an ionic surface- or interface-active compound or an α,β-unsaturated carboxylic acid ester. DMC catalysts with such ligand combinations are described e.g. in EP-A 700 949, EP-A 761 708, WO 97/40086, WO 98/08073, WO 98/16310, WO 99/01203, WO 99/19062, WO 99/19063 or German Patent Application 19905611.0.

The DMC catalysts which are suitable for the process according to the invention can optionally also comprise water and/or one or more water-soluble metal salts of the formula (I) from the preparation of the double metal cyanide compound.

The DMC catalysts according to the invention are conventionally prepared in aqueous solution by reaction of metal salts, in particular of the formula (I), with metal cyanide salts, in particular of the formula (II), organic complexing ligands a) and optionally one or more further complex-forming components b).

The aqueous solutions of the metal salt (e.g. zinc chloride, employed in stoichiometric excess (at least 50 mol %, based on the metal cyanide salt)) and of the metal cyanide salt (e.g. potassium hexacyanocobaltate) are preferably first reacted here in the presence of the organic complexing ligand a) (e.g. tert-butanol), a dispersion forming.

The organic complexing ligand a) can be present here in the aqueous solution of the metal salt and/or other metal cyanide salt, or it is added directly to the dispersion obtained after precipitation of the double metal cyanide compound.

Preferably, the dispersion formed is then also treated with one or more further complex-forming components b). The further complex-forming component b) is preferably employed here in a mixture with water and organic complexing ligand a).

The DMC catalyst dispersion can be prepared e.g. in a stirred tank, optionally by the process variant described in U.S. Pat. No. 5,891,818, in which some of the catalyst dispersion prepared in stirred reactor is circulated and sprayed into the reactor headspace and the circulating stream here is passed though a "high shear in-line mixer".

However, the DMC catalyst dispersion is preferably prepared using a mixing nozzle (e.g. a smooth jet nozzle, Levos nozzle, Bosch nozzle and the like), particularly preferably a jet disperser, such as is described in German Patent Application 199 58 355.2.

In a smooth jet nozzle a first educt stream is first accelerated in a nozzle and atomized at a high flow rate into a slowly flowing second educt stream. Mixing of the two educt streams then takes place via the turbulent disintegration of the resulting jet into eddies of different size (eddy cascade). Compared with the stirred tank, concentration differences can be broken down significantly faster in this manner, since significantly higher and more homogeneous output densities can be achieved.

However, a jet disperser should preferably be employed for the process according to the invention. The jet disperser can be constructed such that two nozzles are arranged in series. A first educt stream is first accelerated to high degree in the first nozzle due to the narrowing in cross-section. The accelerated jet sucks up the second component here because of the high flow rate. The resulting jet is than passed from the mixing chamber through further nozzles arranged perpendicular to the direction of the first educt stream. The distance between the nozzles will preferably be chosen such that because of the short residence time, only seed formation but not crystal growth takes place in the mixing chamber. The rate of seed formation of the solid is thus decisive for the optimum design of the jet disperser. A residence time of 0.0001 s to 0.15 s, preferably 0.001 s to 0.1 s is favourably established. The crystal growth takes place only in the outflow. The diameter of the further nozzles should preferably be chosen such that further acceleration of the partly mixed educt streams takes place there. Because of the shear forces which additionally occur in the further nozzles as a result, the state of homogeneous mixing is achieved by a faster eddy disintegration in a shorter time compared with a smooth jet nozzle. As a result, even in precipitation reactions with a very high rate of seed formation is possible to achieve the state of ideal mixing of the educts, so that it is possible to establish defined stoichiometric compositions during the precipitation reaction. Nozzle diameters of 5,000 $\mu$m to 50 $\mu$m, preferably 2,000 $\mu$m to 200 $\mu$m have proved favourable at pressure losses in the nozzle of 0.1 bar to 1,000 bar or output densities in the range from $1*10^7$ W/m$^3$ to $1*10^{13}$ W/m$^3$.

n nozzles (where n=1-5) can be arranged in succession, depending on the desired particle size, so that a multi-stage jet disperser is obtained. The additional advantage of further dispersers is that particles which have already formed can be comminuted mechanically by the high shear forces in the nozzles. It is possible in this manner to prepare particles with diameters of 20 $\mu$m to 0.1 $\mu$m. Instead of having several nozzles arranged in series, however, the comminution can also be achieved by circulating the dispersion.

Other mixing organs for the preparation of dispersions, such as are described in EP-A 101 007, WO 95/30476 or German Patent Application 199 28 123.8, or combinations of these mixing organs can also be employed.

Heating of the dispersion may occur due to the energy dissipation in the nozzles and the crystallization enthalpy. Since the temperature can have a considerable influence on the crystal formation process, a heat exchanger can be installed downstream of the mixing organ for an isothermal process procedure.

Problem-free scale-up is possible, for example, by the use of a relatively large number of bores, arrangement of several mixing organs in parallel or enlargement of the free nozzle area. However, the latter is not achieved by increasing the nozzle diameter, since the possibility of emergence of a core stream exists in this manner, the result of which is a deterioration in the mixing result. Slits with an appropriate area are therefore preferably to be employed in the case of nozzles with large free nozzle areas.

The DMC catalyst dispersion formed is then separated off by filtration. Many filter devices suitable for mechanically separating off liquids can in principle be employed for this. Suitable filter devices are described, for example, in "Ullmann's Encyclopaedia of Industrial Chemistry", vol. B 2, chapters 9 and 10, VCH, Weinheim, 1998 and H. Gasper, D. Oechsle, E. Pongratz (ed.): "Handbuch der industriellen Fest/Flüssig-Filtration [Handbook of Industrial Solid/Liquid Filtration", Wiley-VCH Verlag GmbH, Weinheim, 2000.

The pressure gradient needed for the filtration can be applied here by gravity, by centrifugal force (e.g. filter centrifuges), preferably by a gas pressure difference (e.g. vacuum filter or pressure filter) or by liquid pressure (e.g. filter presses, drum or disc filters and possibly transverse flow filtration modules). The subsequent filter cake washing can be carried out by mashing or, preferably, by a flow-through washing. In this case the washing liquid flows through the cake and the liquid previously contained in the cake is displaced, diffusion effects also becoming effective here. The removal of moisture from the washed cake can be effected by a gas pressure difference, centrifugal force or mechanical pressing, or preferably by a combination of a moisture removal by a gas pressure difference with subsequent mechanical pressing out. The pressure for the mechanical pressing out can be applied here either mechanically or by membranes.

Both discontinuously and continuously operated filter devices can be employed for separating off the catalysts. Examples of discontinuously operating filter devices are trailing blade and turned-down filter centrifuges, membrane, chamber, frame or tubular filter presses, pressure filter machines, autopress devices, disc pressure, multiple tube and plate filters and vacuum and pressure suction filters. Examples of continuously operating filter devices are screen conveyor presses, pressure and vacuum drum filters, pressure and vacuum disc filters, conveyor belt filters and transverse flow filters.

Vacuum or pressure filters or suction filters are particularly suitable for filtration of the DMC catalyst dispersion on a laboratory scale, and pressure suction filters, filter presses and pressure filter machines are particularly suitable on a technical and industrial scale.

Membrane filter presses have proved to be particularly suitable on a pilot plant and technical scale. With the aid of a suitable filter cloth, preferably a membrane cloth, these allow filtration of the DMC catalyst dispersion on the basis of a liquid pressure gradient applied. The subsequent filter cake washing preferably takes place as a flow-through washing in the filter press, in order thus to simplify and therefore accelerate the preparation process. The preferred ratio of wash liquid to filter cake volume lies in the amounts which effect complete exchange of the amount of liquid present in the original filter cake. The mechanical removal of moisture from the filter cake which follows washing of the filter cake and is preferably to be carried out before the drying can preferably be effected in the filter press, preferably by mechanical pressing out by a pressure applied to the membranes. The mechanical removal of moisture preferably leads to as substantial as possible a removal of the wash liquid from the filter cake.

The filtration is in general carried out at temperatures of 10 to 80° C. The pressure differences applied can be 0.001 bar to 200 bar, preferably 0.1 bar to 100 bar, particularly preferably 0.1 bar to 25 bar, the pressure difference applied depending on the device employed.

After the filtration the moist filter cake (residual moisture in general 30-95 wt. %) is washed, optionally after prior pressing out or mechanical removal of moisture, by suitable devices. This washing is preferably carried out on the filter device with one or more aqueous or non-aqueous solutions of the organic complexing ligand a) and optionally one or more further complex-forming components b) by a flow-through washing, in which the filter cake is not dispersed in the liquid and the washing effect takes place by the solutions flowing through the filter cake and optionally overlapping diffusion effects.

The moist filter cake is preferably first washed with an aqueous solution of the organic complexing ligand a) (e.g. tert-butanol). Water-soluble by-products, such as e.g. potassium chloride, can be removed from the catalyst in this manner. The amount of organic complexing ligand a) in the aqueous washing solution is preferably 40 to 80 wt. %, based on the total solution. It is furthermore preferable to add to the aqueous washing solution some further complex-forming component b), preferably 0.5 to 5 wt. %, based on the total solution.

After this first washing step, further washing steps with aqueous or non-aqueous solutions of the organic complexing ligand a) and optionally one or more further complex-forming components b) can follow, these likewise being carried out according to the invention as a filter cake washing. The activity of the catalyst can be increased further by this means. However, it has been found that a single washing of the filter cake with an aqueous solution of the organic complexing ligand a) and optionally one or more further complex-forming components b) by a filter cake washing is often already sufficient to obtain DMC catalysts with an exceptionally high activity.

A significant reduction in the total amount of washing solution to be employed is often possible in the process according to the invention, compared with the processes of the prior art, so that the process according to the invention also leads to a reduction in the material costs of preparation of DMC catalysts.

The amount of washing liquid employed, based on the filter cake volume, is in general 0.5/l to 1,000/l, preferably 1/l to 500/l (in each case based on the volume), particularly preferably precisely the amount of washing liquid necessary for as complete as possible a replacement of the liquid originally present in the filter cake. The filter cake washing is in general carried out at temperatures of 10 to 80° C., preferably 15 to 60° C.

The filter cake washing is carried out under pressures of 0.001 bar to 200 bar, preferably 0.1 bar to 100 bar, particularly preferably 0.1 bar to 25 bar.

The washing times are some minutes to several hours.

It has proved advantageous to press out the washed filter cake, after the filter cake washing, under pressures of 0.5 to 200 bar, preferably under pressures which are as high as possible. This can be carried out e.g. directly after the filter cake washing, in a filter press or by means of other suitable pressing devices which allow application of a mechanical pressure, so that the liquid present in the filter cake can escape through a membrane or a suitable filter cloth.

The DMC catalyst is then dried at temperatures of about 20 to 120° C. under pressures of about 0.1 mbar to normal pressure (1,013 mbar). Contact dryers and convection dryers and also spray dryers are suitable for this. Drying can optionally also be carried out directly in the devices for mechanically separating off liquid if these are suitable for this (e.g. suction dryer, centrifuge dryer and "hot filter press").

The present invention also provides the use of the DMC catalysts prepared by the process according to the invention in a process for the preparation of polyether polyols by polyaddition of alkylene oxides on to starter compounds containing active hydrogen atoms.

A significant shortening of the process times of the preparation of DMC catalysts compared with the prior art is possible by this improved preparation process for DMC catalysts. Since DMC catalysts which are prepared by the new, improved process have a comparable activity in the preparation of polyether polyols to that of DMC catalysts which are prepared in a considerably more expensive manner by the prior art to date, this leads to a considerably increased profitability of the DMC-catalysed process for the preparation of polyether polyols.

Because of their exceptionally high activity, the DMC catalysts prepared by the process according to the invention can often be employed in very low concentrations (25 ppm and less, based on the amount of polyether polyol to be prepared). If the polyether polyols prepared in the presence of the DMC catalysts prepared by the process according to the invention are used for the preparation of polyurethanes, removal of the catalyst from the polyether polyol can be omitted without the product qualities of the polyurethane obtained being adversely influenced.

EXAMPLES

Preparation of the Catalyst

Example 1

Comparison Example: Catalyst A
(Preparation of the Catalyst with a Single Washing of the Filter Cake by Redispersing with Subsequent Filtration)

A solution of 81.25 g zinc chloride in 810 g distilled water is circulated at 45° C. in a loop reactor which comprises a jet disperser (1 bore of diameter 0.7 mm). A solution of 26 g potassium hexacyanocobaltate in 200 g distilled water is metered into this. The pressure loss in the jet disperser here is 2.5 bar. Directly after the precipitation a mixture of 325 g tert-butanol and 325 g distilled water is metered in and the dispersion is circulated for 80 min at 45° C. under a pressure loss in the jet disperser of 2.5 bar. A mixture of 6.5 g cholic acid sodium salt, 6.5 g tert-butanol and 650 g distilled water is then metered in and the dispersion is subsequently circulated for 20 min under a pressure loss in the jet disperser of 2.5 bar. The solid is isolated by filtration over a vacuum suction filter. The moist filter cake is then washed with a mixture of 13 g cholic acid sodium salt, 455 g tert-butanol and 195 g distilled water by circulation in the loop reactor for 20 min at 45° C. under a pressure loss in the jet disperser of 2.5 bar. The solid is filtered again over a vacuum suction filter and the moist filter cake is then dried at 100° C. for 5 h under a high vacuum.

Example 2

Comparison Example: Catalyst B
(Preparation of the Catalyst with Washing of the Filter Cake Twice by Redispersing with Subsequent Filtration)

A solution of 81.25 g zinc chloride in 810 g distilled water is circulated at 45° C. in a loop reactor which comprises a jet disperser (1 bore of diameter 0.7 mm). A solution of 26 g potassium hexacyanocobaltate in 200 g distilled water is metered into this. The pressure loss in the jet disperser here is 2.5 bar. Directly after the precipitation a mixture of 325 g tert-butanol and 325 g distilled water is metered in and the dispersion is circulated for 80 min at 45° C. under a pressure loss in the jet disperser of 2.5 bar. A mixture of 6.5 g cholic acid sodium salt, 6.5 g tert-butanol and 650 g distilled water is then metered in and the dispersion is subsequently circulated for 20 min under a pressure loss in the jet disperser of 2.5 bar. The solid is isolated by filtration over a vacuum suction filter. The moist filter cake is then washed with a mixture of 13 g cholic acid sodium salt, 455 g tert-butanol and 195 g distilled water by circulation in the loop reactor for 20 min at 45° C. under a pressure loss in the jet disperser of 2.5 bar. The solid is filtered again over a vacuum suction filter and the moist filter cake is finally washed once again with a mixture of 4.8 g cholic acid sodium salt, 650 g tert-butanol and 65 g distilled water by circulating in the loop reactor for 20 min at 45° C. under a pressure loss in the jet disperser of 2.5 bar. After renewed filtration over a vacuum suction filter, the washed, moist filter cake is dried at 100° C. for 5 h under a high vacuum.

Example 3

Catalyst C
(Preparation of the Catalyst with a Single Filter Cake Washing)

A solution of 81.25 g zinc chloride in 810 g distilled water is circulated at 45° C. in a loop reactor which comprises a jet disperser (1 bore of diameter 0.7 mm). A solution of 26 g potassium hexacyanocobaltate in 200 g distilled water is metered into this. The pressure loss in the jet disperser here is 2.5 bar. Directly after the precipitation a mixture of 325 g tert-butanol and 325 g distilled water is metered in and the dispersion is circulated for 80 min at 45° C. under a pressure loss in the jet disperser of 2.5 bar. A mixture of 6.5 g cholic acid sodium salt, 6.5 g tert-butanol and 650 g distilled water is then metered in and the dispersion is subsequently circulated for 20 min under a pressure loss in the jet disperser of 2.5 bar. 350 g of this dispersion are filtered in a pressure suction filter under an increased pressure of 2.0 bar. The moist filter cake in the pressure suction filter is then washed under an increased pressure of 3.0 bar with a mixture of 2 g cholic acid sodium salt, 70 g tert-butanol and 30 g distilled water by a filter cake washing. The washed, moist filter cake is dried at 100° C. for 5 h under a high vacuum.

Example 4

Comparison Example: Catalyst D (Preparation of the Catalyst with Washing of the Filter Cake Twice by Redispersing with Subsequent Filtration)

A solution of 1.625 kg zinc chloride in 16.2 kg distilled water is circulated at 35° C. in a loop reactor which comprises a jet disperser (110 bores of diameter 0.7 mm). A solution of 0.52 kg potassium hexacyanocobaltate in 4.0 kg distilled water is metered into this. The pressure loss in the jet disperser here is 1.2 bar. Directly after the precipitation a mixture of 6.5 kg tert-butanol and 6.5 kg distilled water is metered in and the dispersion is circulated for 20 min at 35° C. under a pressure loss in the jet disperser of 1.2 bar. A mixture of 0.13 kg cholic acid sodium salt, 0.13 kg tert-butanol and 13.0 kg distilled water is then metered in and the dispersion is subsequently circulated for 10 min under a pressure loss in the jet disperser of 0.1 bar. The solid is filtered in a membrane filter press under an increased pressure of 2.0 bar and pressed out under 4.0 bar. The moist, pressed-out filter cake is then washed with a mixture of 0.26 kg cholic acid sodium salt, 9.1 kg tert-butanol and 3.9 kg distilled water by circulating in the loop reactor for 20 min at 35° C. under a pressure loss in the jet disperser of 1.8 bar. The solid is filtered again in a membrane filter press under an increased pressure of 2.0 bar and pressed out under 4.0 bar, and the moist, pressed-out filter cake is finally washed once again with a mixture of 0.096 kg cholic acid sodium salt, 13 kg tert-butanol and 1.3 kg distilled water by circulating in the loop reactor for 20 min at 35° C. under a pressure loss in the jet disperser of 1.8 bar. After renewed filtration in a membrane filter press under 2.0 bar and pressing out of the filter cake under 4.0 bar, the moist, pressed-out filter cake is dried at 100° C. for 5 h under a high vacuum.

Example 5

Catalyst E (Preparation of the Catalyst with a Single Filter Cake Washing)

A solution of 1.625 kg zinc chloride in 16.2 kg distilled water is circulated at 35° C. in a loop reactor which comprises a jet disperser (110 bores of diameter 0.7 mm). A solution of 0.52 kg potassium hexacyanocobaltate in 4.0 kg distilled water is metered into this. The pressure loss in the jet disperser here is 1.2 bar. Directly after the precipitation a mixture of 6.5 kg tert-butanol and 6.5 kg distilled water is metered in and the dispersion is circulated for 20 min at 35° C. under a pressure loss in the jet disperser of 1.2 bar. A mixture of 0.13 kg cholic acid sodium salt, 0.13 kg tert-butanol and 13.0 kg distilled water is then metered in and the dispersion is subsequently circulated for 10 min under a pressure loss in the jet disperser of 0.1 bar. The solid is filtered in a membrane filter press under an increased pressure of 2.0 bar. The moist filter cake in the membrane filter press is then washed under an increased pressure of 2.5 bar with a mixture of 0.22 kg cholic acid sodium salt, 8.0 kg tert-butanol and 3.4 kg distilled water by a filter cake washing and the washed filter cake is then pressed out under an increased pressure of 5.0 bar. The moist, pressed-out filter cake is dried at 100° C. for 5 h under a high vacuum.

Preparation of Polyether Polyols

General Procedure 50 g polypropylene glycol starter (molecular weight=1,000 g/mol) and 5 mg catalyst (25 ppm, based on the amount of polyether polyol to be prepared) are initially introduced into a 500 ml pressure reactor under an inert gas (argon) and are heated up to 105° C., while stirring. 10 g propylene oxide are then metered in all at once. Further propylene oxide is only metered in again when an accelerated drop in pressure in the reactor is observed. This accelerated drop in pressure indicates that the catalyst is activated. The remaining propylene oxide (140 g) is then metered in continuously under a constant overall pressure of 2.5 bar. When metering of the propylene oxide is complete and after an after-reaction time of 2 hours at 105° C., volatile contents are distilled off at 90° C. (1 mbar) and the mixture is then cooled to room temperature.

The resulting polyether polyols are characterized by determination of the OH numbers, the double bond contents and the viscosities.

The course of the reaction was monitored with the aid of time/conversion curves (propylene oxide consumption [g] v. reaction time [min]). The induction time was determined from the point of intersection of the tangent at the steepest point of the time/conversion curve with the extended base line of the curve. The propoxylation times, which are decisive for the catalyst activity, correspond to the period of time between activation of the catalyst (end of the induction period) and the end of metering of the propylene oxide.

Example 6

Comparison: Preparation of Polyether Polyol with Catalyst A (25 ppm)

| Propoxylation time: | | 31 min |
|---|---|---|
| Polyether polyol: | OH number (mg KOH/g): | 28.7 |
| | Double bond content (mmol/kg): | 6 |
| | Viscosity 25° C. (mPas): | 882 |

Example 7

Comparison: Preparation of Polyether Polyol with Catalyst B (25 ppm)

| Propoxylation time: | | 20 min |
|---|---|---|
| Polyether polyol: | OH number (mg KOH/g): | 28.9 |
| | Double bond content (mmol/kg): | 5 |
| | Viscosity 25° C. (mPas): | 893 |

Example 8

Preparation of Polyether Polyol with Catalyst C (25 ppm)

| | | |
|---|---|---|
| Propoxylation time: | | 19 min |
| Polyether polyol: | OH number (mg KOH/g): | 29.3 |
| | Double bond content (mmol/kg): | 5 |
| | Viscosity 25° C. (mPas): | 887 |

Example 9

Comparison: Preparation of Polyether Polyol with Catalyst D (25 ppm)

| | | |
|---|---|---|
| Propoxylation time: | | 19 min |
| Polyether polyol: | OH number (mg KOH/g): | 29.2 |
| | Double bond content (mmol/kg): | 6 |
| | Viscosity 25° C. (mPas): | 832 |

Example 10

Preparation of Polyether Polyol with Catalyst E (25 ppm)

| | | |
|---|---|---|
| Propoxylation time: | | 20 min |
| Polyether polyol: | OH number (mg KOH/g): | 28.9 |
| | Double bond content (mmol/kg): | 6 |
| | Viscosity 25° C. (mPas): | 869 |

What is claimed is:

1. A process for preparing a double-metal cyanide catalyst comprising:
   1) combining
      a) at least one aqueous solution of at least one metal salt; with
      b) at least one aqueous solution of at least one metal cyanide salt; in the presence of
      c) tert-butanol and cholic acid sodium salt, in a manner such that a double-metal cyanide catalyst dispersion is formed;
   2) filtering the double-metal cyanide catalyst dispersion in a manner such that a filter cake is obtained;
   3) washing the filter cake at least once with at least one organic complexing ligand by a filter-cake washing;
   4) mechanically removing moisture in the washed filter cake; and
   5) drying the filter cake.

2. A process for preparing a double-metal cyanide catalyst comprising:
   1) combining
      a) at least one aqueous solution of at least one metal salt; with
      b) at least one aqueous solution of at least one metal cyanide salt; in the presence of
      c) at least one organic complexing ligand; in a manner such that a double-metal cyanide catalyst dispersion is formed;
   2) filtering the double-metal cyanide catalyst dispersion in a manner such that a filter cake is obtained;
   3) washing the filter cake at least once with aqueous solutions of tert-butanol and cholic acid sodium salt by a filter-cake washing;
   4) mechanically removing moisture in the washed filter cake; and
   5) drying the filter cake.

3. A process for preparing a double-metal cyanide catalyst comprising:
   1) combining
      a) at least one aqueous solution of at least one metal salt; with
      b) at least one aqueous solution of at least one metal cyanide salt; in the presence of
      c) at least one organic complexing ligand; in a manner such that a double-metal cyanide catalyst dispersion is formed;
   2) filtering the double-metal cyanide catalyst dispersion in a manner such that a filter cake is obtained;
   3) washing the filter cake at least once with non-aqueous solutions of tert-butanol and cholic acid sodium salt by a filter-cake washing;
   4) mechanically removing moisture in the washed filter cake; and
   5) drying the filter cake.

4. The process of claim 1 in which the metal salt is zinc chloride.

5. The process of claim 1 in which the metal cyanide salt is potassium hexacyanocobaltate.

6. The process of claim 1 in which steps 2 and 3 are conducted in a filter press.

7. The process of claim 1 in which steps 2, 3 and 4 are conducted in a filter press.

8. The process of claim 1 in which the combination is carried out with a mixing nozzle.

9. The process of claim 8 in which the mixing nozzle is a jet disperser.

10. The process of claim 2 in which the metal salt is zinc chloride.

11. The process of claim 2 in which the metal cyanide salt is potassium hexacyanocobaltate.

12. The process of claim 2 in which steps 2 and 3 see conducted in a filter press.

13. The process of claim 2 in which steps 2, 3 and 4 are conducted in a filter press.

14. The process of claim 2 in which the combination is carried out with a mixing nozzle.

15. The process of claim 14 in which the mixing nozzle is a jet disperser.

16. The process of claim 3 in which the metal salt is zinc chloride.

17. The process of claim 3 in which the metal cyanide salt is potassium hexacyanocobaltate.

18. The process of claim 3 in which steps 2 and 3 are conducted in a filter press.

19. The process of claim 3 in which steps 2, 3 and 4 are conducted in a filter press.

20. The process of claim 3 in which the combination is carried out with a mixing nozzle.

21. The process of claim 20 in which the mixing nozzle is a jet disperser.

* * * * *